J. J. LASSEN & V. F. HJORT.
APPARATUS FOR THE SOFTENING AND PURIFICATION OF WATER.
APPLICATION FILED MAR. 12, 1917.

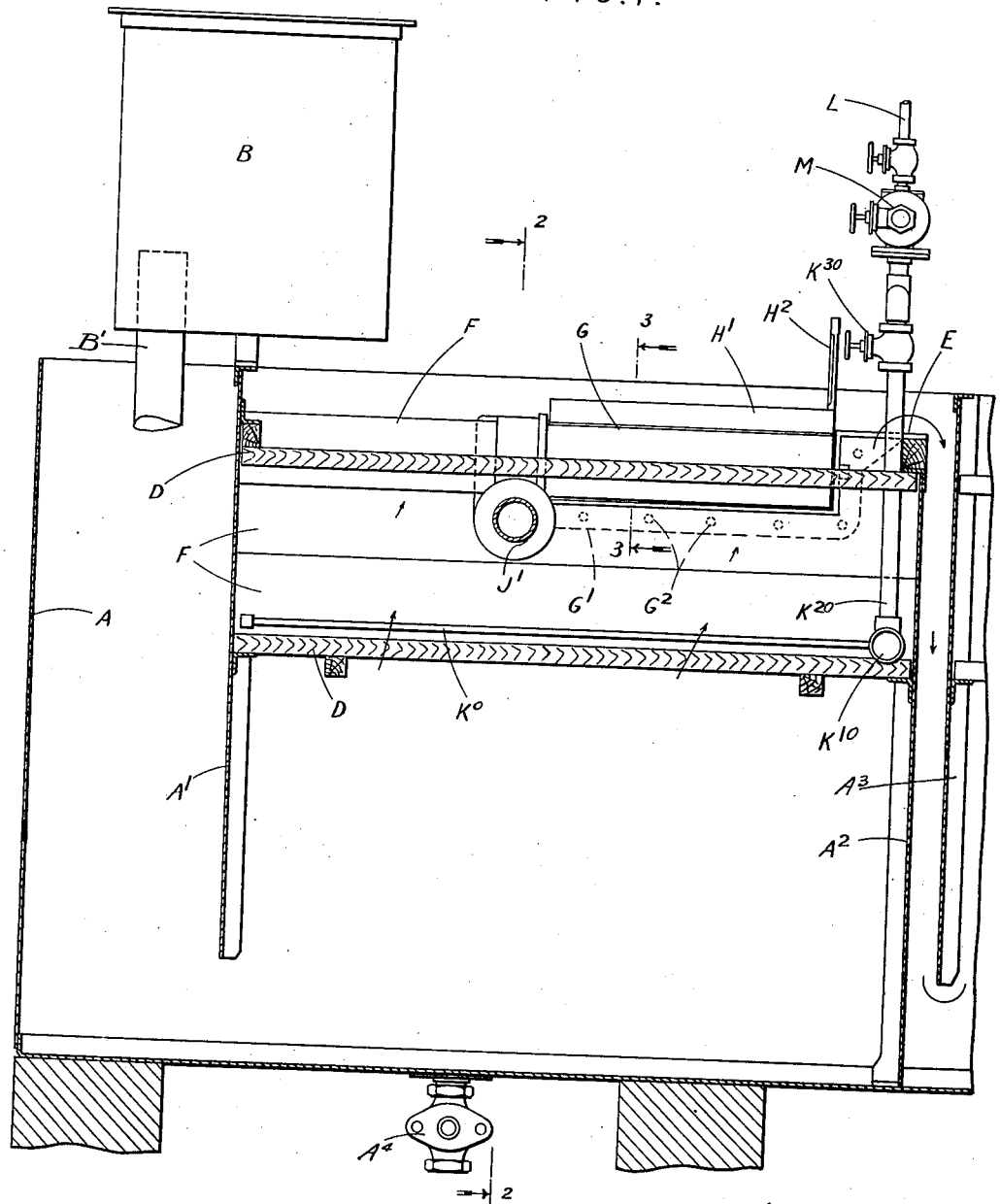

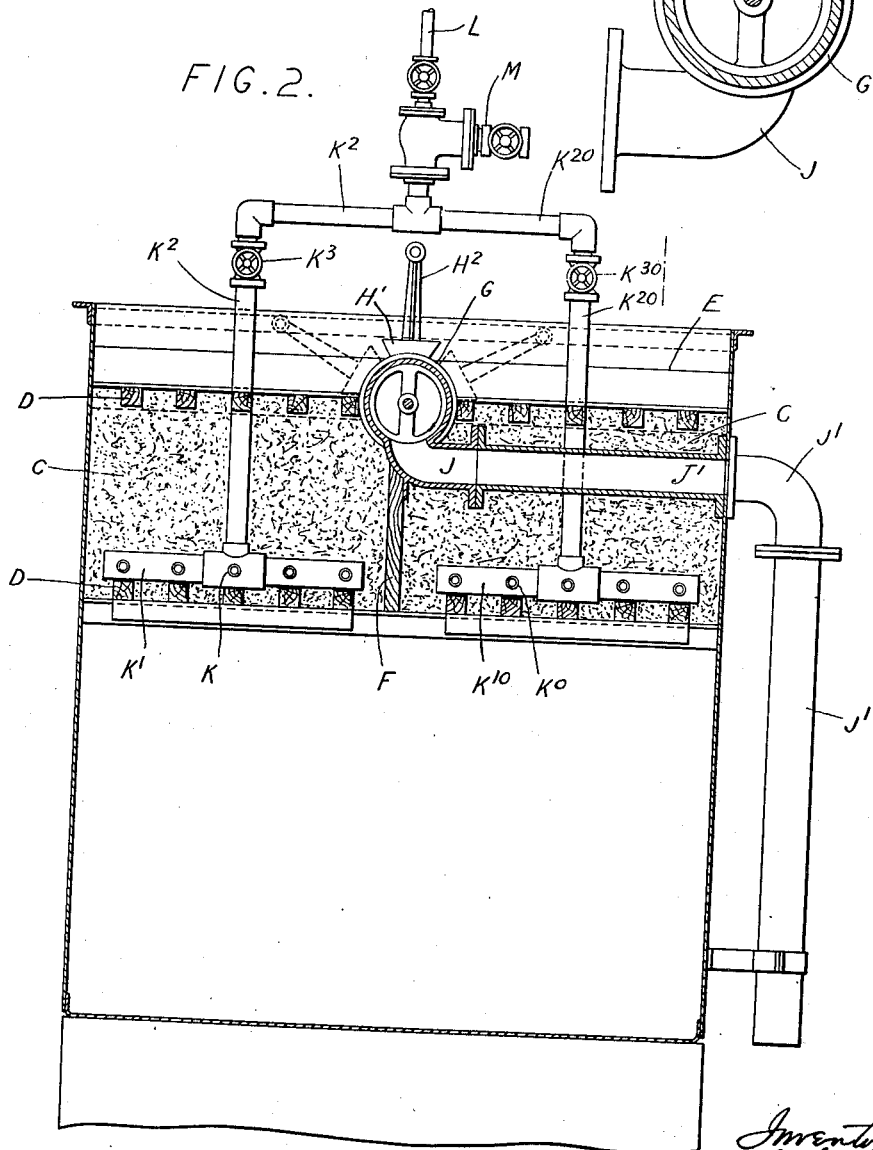

1,265,346.

Patented May 7, 1918.
3 SHEETS—SHEET 3.

UNITED STATES PATENT OFFICE.

JENS JAKOB LASSEN AND VILHELM FREDERIK HJORT, OF LONDON, ENGLAND.

APPARATUS FOR THE SOFTENING AND PURIFICATION OF WATER.

1,265,346.  Specification of Letters Patent.  Patented May 7, 1918.

Application filed March 12, 1917. Serial No. 154,347.

*To all whom it may concern:*

Be it known that we, JENS JAKOB LASSEN, formerly a subject of the King of Denmark, now a naturalized subject of the King of England, and VILHELM FREDERIK HJORT, a subject of the King of Denmark, both residing at London, in England, have invented certain new and useful Improvements in Apparatus for the Softening and Purification of Water, of which the following is a specification.

This invention relates to apparatus for the softening and purification of water and has for its object to facilitate the cleansing of the filtering material employed in such apparatus. In certain constructions of apparatus of this type the water after being subjected to treatment with lime or the like for softening or other purposes passes upwardly from a settling tank through a layer of filtering material whence it flows over a weir into a tank from which it is subsequently drawn off for use. The filtering material commonly employed for this purpose is that known as wood wool or some like substance which will form a dense mass with a multiplicity of interstices through which the water percolates in its upward passage the sludge and like substances which are in suspension in the water adhering to the filtering material. From time to time it is necessary to cleanse this filtering material a process which gives rise to difficulties and involves the expenditure of time and labor. The cleansing is usually effected by removing the filtering mattress or layer and treating it outside the water purifying plant.

According to this invention as applied to apparatus of the type indicated above, the cleansing of the filtering material is effected by causing the flow of water through it, to be increased in velocity and at the same time agitated or broken up as it passes through the interstices of the filtering mass. The agitation is caused by blowing a gaseous medium such as steam or air or both into the water as it enters the filtering mass with the result that the sludge or the like adhering to the filtering material is loosened and carried up by the water flowing through the mass whence it can be conveyed away through a separate channel provided for the purpose.

The removal of the sludge from the filtering material by this process is to be distinguished from known processes for the washing of sand and the like employed for filtration purposes where the foreign matter which it is desired to remove by washing is deposited in a different manner. In sand filters the deposit is mainly on and near the surface against which the water first comes in contact as it flows through the filtering mass and hence the washing of the sand and the removal of the foreign matter involves reversal of the direction of flow in order to effectively perform the desired cleansing. In the case of sludge deposit after the water has been subjected to a softening process this sludge is deposited as mentioned on the material forming the filtering medium as a result of adhesion to this medium and when this filtering mass is agitated as in the present invention the sludge has its hold on the filtering medium loosened and it can then be carried through the filtering mass without reversing the direction of flow of the water.

Preferably when the area of the mass of filtering material is large it is divided into separate compartments by means of one or more partitions and the means for agitating the water and for drawing off the water and sludge are so arranged that the cleansing of a portion of the whole filtering mass can be effected while filtering continues to take place uninterruptedly through the remainder of the mass. Thus in such a construction each compartment is provided with or can be placed in communication with an outlet for the water and sludge such outlet being conveniently above the upper surface of the filtering mass but below the normal water level, that is to say, the level of the weir or other outlet through which the filtered liquid passes when the plant is in normal operation. The outlet for the water and sludge is provided with some form of cock or valve or is otherwise arranged so that it can be closed except when the filter or a portion of it is being cleansed.

In place of each compartment being provided with a separate outlet a single outlet may be employed to convey away the wash water and sludge from either of two adjacent compartments of the tank or containing vessel. This is effected by suitably disposing one pipe between or at the side of the two compartments and by providing a bucket or trough which can be tilted or inclined toward one compartment or the other. This movable bucket or trough is in communication with the outlet pipe to which it leads the wash water from the particular compartment which is being cleaned. The trough is arranged and is of such shape and dimensions that when it is moved so as to occupy an intermediate position between the two compartments its mouth will be above the normal water level when the usual filtering operation is taking place and thus no water will, in such circumstances, pass away to the outlet pipe.

By this construction it is possible to avoid the necessity of providing separate valves or cocks to control the outflow of water from the several compartments when cleansing of the filtering material in these compartments is taking place. The tilting trough or bucket permits the water to be drawn off or its flow to be stopped between either of the two compartments between which it is arranged and thus may be considered as acting as a two-way cock in the outlet pipe.

In the accompanying drawings,

Figure 1 is a longitudinal section through one construction of apparatus for softening and purifying water according to this invention.

Fig. 2 is a transverse section on the line 2—2 of Fig. 1.

Fig. 3 is a section of part of the apparatus taken on the line 3—3 of Fig. 1 and drawn to a larger scale.

Figure 4:
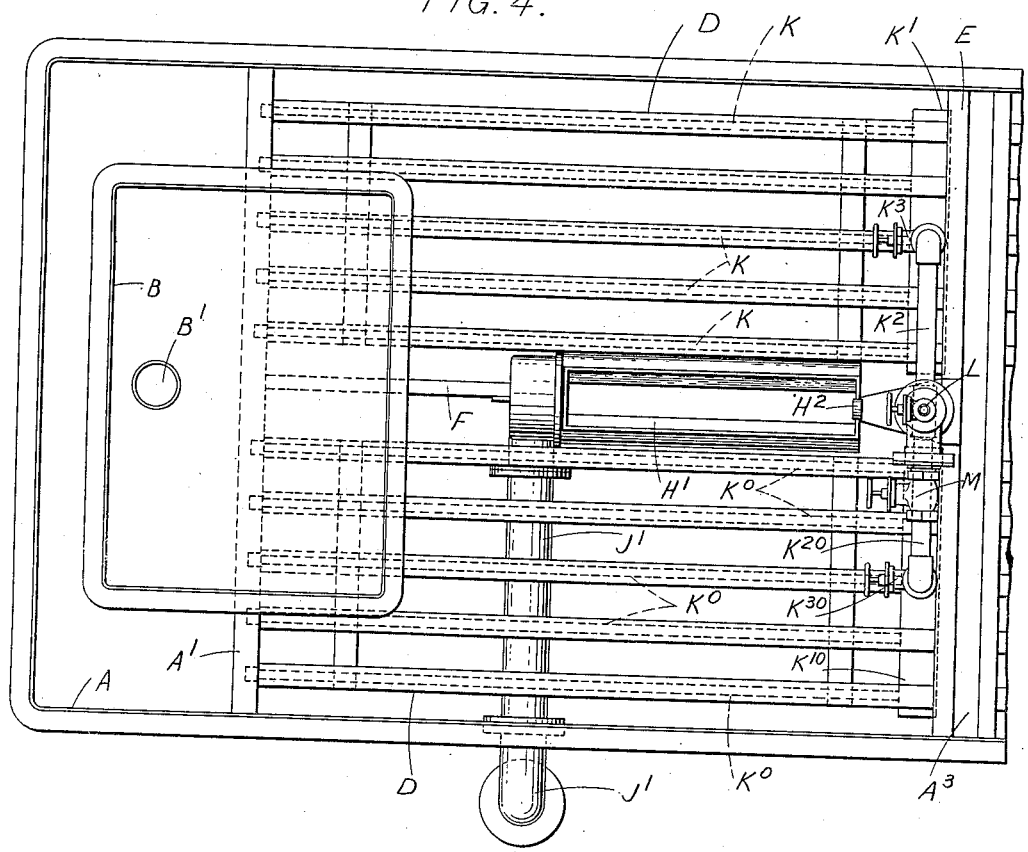
Fig. 4 is a plan view of the apparatus.

The apparatus comprises a tank or containing vessel A provided with a partition A' which extends nearly to the bottom of the tank. Into the space between the partition A' and the adjacent wall of the tank A water is passed through an inlet pipe B' after chemical treatment in the tank B. Between the other side of the partition A' and the opposite wall of the tank A a filtering mass C of wood wool or other suitable material is supported between frames or battens D. In the normal operation of the filter the water passes up through the filtering mass and thence over a weir at E formed by the top edge of the side wall $A^2$ which is lower than the main walls of the tank. The apparatus illustrated forms part of a larger apparatus in which the water is treated successively in two or more filters and a portion of the second filter is shown in Fig. 1 where the wall $A^3$ of the second filter corresponds to the partition or wall A' of the first filter. The normal course of the water is shown by the arrows in Fig. 1 and the water from the first filter passes down between the walls $A^2$ and $A^3$ and thence up into a second filter similar to the first. This general type of filter is well known.

The filtering mass C is divided into two separate compartments by means of a partition F the top edge of which is somewhat higher than the top surface of the filtering mass. On this partition is mounted a trough or casing G containing an inner trough H' having a hopper-like mouth. The trough H' is capable of partial rotation in the casing G and is provided with a handle $H^2$ by means of which it can be rocked into either of the three positions shown in Fig. 2. The end of the trough H' near the center of the apparatus is open so that wash water can pass from it into a pipe J in communication with the other trough or casing G and leading away to the outlet or wash water pipe J'. The trough G is mounted on the compartment F by means of a flange G' and bolts $G^2$ shown in dotted lines in Fig. 1.

Along the bottom of the filtering mass C are a number of perforated pipes K, $K^0$ connected by headers K', $K^{10}$ which are joined through pipes $K^2$, $K^{20}$ to a steam inlet L and an air inlet M. At L any convenient form of injector is arranged so that on opening the appropriate cocks a stream of steam and air flows through the pipes $K^2$, $K^{20}$ the headers K', $K^{10}$ and the pipes K or $K^0$ up through the filtering mass. It will be seen that the pipe $K^2$ is provided with a cock $K^3$ and the pipe $K^{20}$ with a similar cock $K^{30}$, so that the steam and air can be admitted to either or both of the compartments containing the filtering material.

During the normal operation of the filter the handle $H^2$ is in the vertical position shown in full lines in Fig. 2 and then the trough-like inlet or mouth of the trough H' is as shown in Fig. 1 above the level of the weir at E.

Suppose now that it be desired to clean the filtering material in the compartment shown at the left hand of Fig. 2, the handle $H^2$ is moved to the left and the trough H brought into the position indicated on the left hand side of the figure. The cocks at L and M are opened and the cock $K^3$ to the left hand is also opened, the other cock $K^{30}$ on the right hand side of the apparatus being kept closed. Steam and air now enter below the filtering mass in the left hand compartment and agitate it and the water flowing up through the material carries with it the loosened sludge. As the mouth of the trough H' is now below the level of the weir the water and sludge in the left hand compartment flow through the trough H and the pipes J and J' and away, the normal filtering operation proceeding in the right hand compartment of the apparatus.

Obviously by turning the handle $H^2$ in the right hand direction, opening the right hand cock K³ and closing the left hand cock K³ the filtering material in the right hand compartment could be cleansed while allowing the normal filtering operation to proceed in the left hand compartment.

Figure 5:
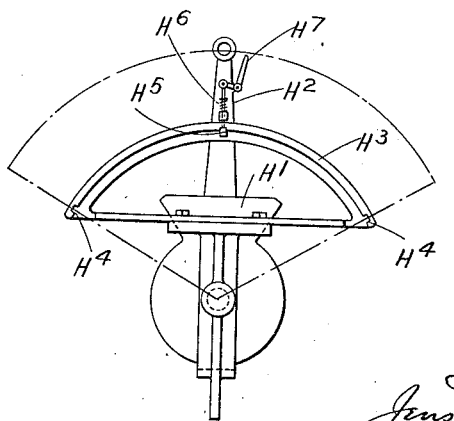
Fig. 5 is an elevation showing a detail of the tilting trough or bucket drawn to a larger scale.

Any convenient means may be employed for moving and setting the trough H' so as to position it according to requirements and fix it in the necessary positions. Fig. 5 shows one suitable mechanism where an arc shaped member H³ is fixed adjacent to the handle H² of the trough H' and is provided with three notches H⁴ one central and one at each end. With these notches a catch or detent H⁵ can engage, such catch being controlled by a spring H⁶ and a pivoted lever H⁷. When the catch H⁶ engages with the central notch as shown in Fig. 5 the trough H' is held upright but by moving the lever H⁷ the catch H⁵ can be disengaged from the central notch and the handle moved either to the right hand or left hand to carry the trough into one or other of its inclined positions where it can be retained by allowing the catch H⁵ to engage with the corresponding notch.

Although in the apparatus illustrated the outlet for the wash water is in the form of a trough which can be rocked or tilted so as to allow the wash water to pass out yet it is to be understood that the construction hereinbefore described may be adopted wherein a fixed outlet is provided below the level of the weir such outlet being closed by some suitable form of valve during the normal filtering operation and only opened when the cleansing of the particular compartment is to be effected.

Obviously although the perforated pipes K are shown in the example illustrated as passing through the lower part of the filtering mass C yet they might be placed just below that material beneath the lower battens D. The cock A⁴ shown in Fig. 1 is intended for disengaging the sludge from the tank A.

It is to be noted that with the improved process and apparatus for cleansing the filtering material it is not necessary to reverse the flow of the water through the filtering mass and considerable time and labor are saved which would otherwise be incurred if the filtering material had to be removed and separately cleansed.

Though the present invention is as already indicated primarily intended for the cleansing of filtering material of a fibrous or like nature such as wood wool it is to be understood that the same process may be adopted with advantage where granular material is used and the flow of water through that material is in an upward direction.

The details of construction of the whole apparatus may be varied and as will be understood the invention may be applied to water softening and like plants of types other than that more particularly indicated and shown in the drawings.

What we claim as our invention and desire to secure by Letters Patent is:—

1. In apparatus for the softening and purification of water in which the normal direction of flow of the water is upward the combination of a vessel or container, a mass of filtering material in the upper part of said vessel through which filtering material the water flows in an upward direction, an inlet for the water to be filtered below the filtering mass, an outlet for the filtered water above the filtering mass, means for agitating the water by blowing a gaseous medium into it as it passes through the filtering mass to separate the sludge deposited therein, and means for drawing off the water and sludge thus separated from the filtering material the whole arrangement being such that the cleansing operation takes place without reversing the normal direction of flow of the water being treated.

2. In apparatus for the softening and purification of water the combination of a settling tank, a mass of filtering material in the upper part of the tank through which filtering material the water flows in an upward direction, a weir over which the filtered water passes, means for agitating the water as it passes through the filtering mass by blowing a gaseous medium such as steam or air into the water below the mass, and an outlet for drawing off the water with the sludge suspended therein from above the filtering mass at a level which is below that of the weir, the whole arrangement being such that the cleansing operation takes place without reversing the normal direction of flow of the water being treated.

3. In apparatus for the softening and purification of water in which the normal direction of flow of the water is upward the combination of a settling tank, a mass of filtering material in the upper part of said tank divided into a plurality of separate compartments through which material the water flows in an upward direction, means for agitating the water as it passes through the filtering material in any one compartment, and means for drawing off the water and sludge from that compartment while filtering continues to take place uninterruptedly in an upward direction through the remainder of the filtering mass, the whole arrangement being such that the cleansing operation takes place without reversing the normal direction of flow of the water being treated.

4. In apparatus for the softening and purification of water the combination with a settling tank, a mass of filtering material in the upper part of said tank divided into a plurality of separate compartments through which material the water flows in an upward direction, means for agitating the water as it passes through the filtering material in any one compartment, an outlet for the wash water and sludge, and a movable mouth or inlet to such outlet so disposed that it can be brought into coöperation with either one of two compartments for the purpose set forth.

5. In apparatus for the softening and purification of water in which the normal direction of flow of the water is upward the combination of a settling tank, a mass of filtering material in the upper part of said tank divided into a plurality of separate compartments through which material the water flows in an upward direction, valve-controlled inlets near the bottom of the filtering material in each compartment for the admission of steam and air to agitate the water as it passes through the filtering material in any one compartment, and means for drawing off the water and sludge from that compartment while filtering continues to take place uninterruptedly in an upward direction through the remainder of the filtering mass, the whole arrangement being such that the cleansing operation takes place without reversing the normal direction of flow of the water being treated.

6. In apparatus for the softening and purification of water the combination with a settling tank, a mass of filtering material in the upper part of said tank divided into a plurality of separate compartments through which material the water flows in an upward direction, valve-controlled inlets near the bottom of the filtering material in each compartment for the admission of steam and air to agitate the water as it passes through the filtering material, an outlet for the wash water and sludge, and a movable mouth or inlet to such outlet so disposed that it can be brought into coöperation with either one of two compartments for the purpose set forth.

7. In apparatus for the softening and purification of water the combination with a settling tank, a mass of filtering material in the upper part of said tank divided into a plurality of separate compartments through which material the water flows in an upward direction, valve-controlled inlets near the bottom of the filtering material in each compartment for the admission of steam and air to agitate the water as it passes through the filtering material, an outlet for the wash water and sludge, and a movable mouth or inlet to such outlet in the form of a pivoted trough so disposed that it can be brought into coöperation with either one of two compartments for the purpose set forth.

In testimony whereof we have signed our names to this specification in the presence of two subscribing witnesses.

JENS JAKOB LASSEN.
VILHELM FREDERIK HJORT.

Witnesses:
  ARCHIBALD JOHN FRENCH,
  ENID PARKER.